(12) United States Patent  (10) Patent No.: US 7,773,636 B2
Iida  (45) Date of Patent: Aug. 10, 2010

(54) INFORMATION PROCESSING APPARATUS AND METHOD

(75) Inventor: Yasuhiro Iida, Tokyo (JP)

(73) Assignee: Sony Corporation, Tokyo (JP)

( * ) Notice: Subject to any disclaimer, the term of this patent is extended or adjusted under 35 U.S.C. 154(b) by 220 days.

(21) Appl. No.: 11/954,893

(22) Filed: Dec. 12, 2007

(65) Prior Publication Data

US 2008/0159338 A1  Jul. 3, 2008

(30) Foreign Application Priority Data

Dec. 21, 2006  (JP) .......................... P2006-343802

(51) Int. Cl.
*H04J 3/06*  (2006.01)
(52) U.S. Cl. .................. 370/516; 370/429; 370/503
(58) Field of Classification Search ......... 370/369–378, 370/395.64, 414, 498, 503, 516; 375/371–376
See application file for complete search history.

(56) References Cited

U.S. PATENT DOCUMENTS

| 5,367,545 | A | * | 11/1994 | Yamashita et al. | .......... | 375/372 |
| 5,708,686 | A | * | 1/1998 | Assmus et al. | .............. | 375/372 |
| 6,147,694 | A | | 11/2000 | Osaki | | |
| 6,219,396 | B1 | * | 4/2001 | Owada | ........................ | 375/372 |
| 6,643,345 | B1 | * | 11/2003 | Inoue et al. | .................. | 375/372 |
| 7,372,875 | B2 | * | 5/2008 | Hadzic et al. | ............... | 370/516 |
| 7,545,858 | B2 | * | 6/2009 | Jungerman | .................. | 375/226 |
| 2002/0154640 | A1 | | 10/2002 | Wei | | |
| 2005/0117583 | A1 | | 6/2005 | Uchida | | |
| 2007/0206683 | A1 | | 9/2007 | Lin | | |

FOREIGN PATENT DOCUMENTS

| EP | 0 797 325 | 9/1997 |
| JP | 11-177516 | 7/1999 |
| JP | 11-234634 | 8/1999 |
| JP | 2000-35938 | 2/2000 |
| JP | 2002-026853 | 1/2002 |
| JP | 2002-026883 | 1/2002 |
| JP | 2003-249922 | 9/2003 |

OTHER PUBLICATIONS

Office Action issued by Japan Patent Office on Aug. 18, 2009 in corresponding Application No. JP 2006-343602.

* cited by examiner

*Primary Examiner*—Donald L Mills
(74) *Attorney, Agent, or Firm*—Finnegan, Henderson, Farabow, Garrett and Dunner, L.L.P.

(57) ABSTRACT

An information processing apparatus that processes a multiplexed stream including a frame having multiple slots, which is obtained by multiplexing multiple streams containing time information describing times is disclosed. The apparatus includes extracting means for extracting predetermined one or more slots from the frame of the multiplexed stream, storage means for storing data of the slot(s), and frequency dividing means for generating a second clock signal by frequency-dividing a first clock signal by a frequency division ratio N:M based on the number of clocks N corresponding to the time for one frame in the multiplexed stream and the number of clocks M for reading the data of the slot(s) extracted from the one frame from the storage means in the time for the one frame. The data of the slot or slots stored in the storage means is read in synchronization with the second clock signal.

5 Claims, 13 Drawing Sheets

INFORMATION PROCESSING APPARATUS AND METHOD

CROSS REFERENCES TO RELATED APPLICATIONS

The present invention contains subject matter related to Japanese Patent Applications JP 2006-343802 filed in the Japanese Patent Office on Dec. 21, 2006, the entire contents of which being incorporated herein by reference.

BACKGROUND OF THE INVENTION

1. Field of the Invention

The present invention relates to an information processing apparatus and method and, in particular, to an information processing apparatus and method which may easily keep PCR jitter low in a receiver for digital broadcasting, which processes a multiplexed transport stream, for example, obtained by multiplexing multiple transport streams containing a PCR (Program Clock Reference) packet describing a time, for example.

2. Description of the Related Art

In a transmitter used for digital broadcasting such as a BS (Broadcasting Satellite) and a CS (Communications Satellite), multiple transport streams (TS) are time-division multiplexed, and the resulting multiplexed transport stream is transmitted.

FIG. 1 shows a configuration example of a part of a transmitter 1 for digital broadcasting.

In FIG. 1, the transmitter 1 includes a multiplexer section 11.

As the multiple transport streams, eight transport streams, that is, transport streams #0 to #7 are supplied to the multiplexer section 11.

Here, each of the transport streams contains MPEG data resulting from MPEG (Moving Picture Experts Group) encoding of an image or voice or a PCR packet as time information describing times.

The multiplexer section 11 time-division multiplexes the transport streams #0 to #7 supplied thereto and outputs the resulting multiplexed transport stream.

Then, the transmitter 1 performs predetermined processing on the multiplexed transport stream output from the multiplexer section 11 and outputs the resulting broadcasting signal.

Notably, in the multiplexer section 11, a maximum of eight transport streams for one band are time-division multiplexed. Thus, in order to transmit one program by one transport stream, a maximum of eight programs can be transmitted simultaneously in one band.

Though a case where one program is transmitted by one transport stream will be described below, multiple programs can be transmitted by one transport stream alternatively.

FIG. 2 shows the multiplexed transport stream.

In FIG. 2, the multiplexed transport stream contains multiple frames, and one frame corresponds to a time equal to about 1.38 ms. The frame has multiple slots, that is, 48 slots including slots #1 to #48. The time-division multiplexing of transport streams is performed in slots.

The size of a slot (data length) is fixed to 204 bytes. The first one byte of a slot is 47H in base 16, that is, 01000011 in base 2 and functions as a synchronization signal in MPEG 2.

In transmitter 1, which transport stream is to be assigned to which slot, that is, the assignment of a transport stream to a slot is arbitrary and is performed based on a predetermined assignment.

The multiplexer section 11 of the transmitter 1 assigns the transport streams #0 to #7 to the slots #1 to #48 based on a predefined assignment.

FIG. 3 shows a state where the transport streams #0 to #7 are assigned to the slots #1 to #48.

In FIG. 3, the transport stream #0, transport stream #1 and transport stream #2 are assigned to the slots #2 and #47, slots #1 and #48 and slot #3, respectively, for example.

Notably, the transmitter 1 can change the setting of the assignment of transport streams to slots. However, the assignment is constant in each frame of a super frame (SF) containing eight frames.

TMCC (Transmission and Multiplexing Configuration Control) information of ISDB (Integrated Services Digital Broadcasting), which is control information including information describing the assignment of transport streams to slots, is added to the beginning of each frame of the multiplexed transport stream.

A receiver that receives a broadcasting signal transmitted from the transmitter 1 includes a demultiplexer, a buffer, and a decoder. The demultiplexer extracts a slot storing data of a preselected program transport stream (which will be called selected transport stream) of a program selected by a user for viewing, for example, from the multiplexed transport stream obtained by performing predetermined processing on the broadcasting signal. The buffer stores the data of the slot extracted by the demultiplexer. The decoder decodes the data of the slot read out and output from the buffer, that is, the data of the selected transport stream.

FIG. 4 shows the multiplexed transport stream to be processed by the receiver.

In FIG. 4, the transport streams #0 and #2 as the selected transport streams are stored in the slots #2, #3 and #47 (shaded in FIG. 4), for example, and the demultiplexer in a receiver extracts and outputs the data of the slots #2, #3 and #47, for example.

Since the data pieces of the slots extracted by the demultiplexer exist so-called intermittently in a frame, the data pieces of the slots to be output by the demultiplexer are intermittent.

When the intermittent data pieces of the slots, that is, the selected transport streams are supplied to the decoder as they are, the PCR packets contained in the selected transport streams are supplied to the decoder at different times, which means that the PCR jitter is high. Therefore, it may be difficult for the decoder to perform normally.

Accordingly, in the receiver, the data pieces of the slots extracted from a frame are temporarily stored in the buffer. Then, the remaining amount of the storage space of the buffer is detected, and control is performed for reading the data pieces of the slots from the buffer so as to keep the remaining amount substantially constant. The data pieces of the slots read from the buffer, that is, the selected transport streams are supplied to the decoder.

Thus, in the receiver, the selected transport streams are serially supplied to the decoder, resulting in the PCR jitter to some extent.

Notably, there have been proposed a method for controlling the recording of a data packet in buffer means based on the number of remaining data packets, which are stored in the buffer means and have not been output yet, and an output signal for controlling the output of the data packets from the buffer means (refer to JP-A-11-234634 (Patent Document 1), for example) and a method for controlling the timing for returning the address of a temporary storage memory to be written by memory control means to the beginning and the timing for returning the address of the temporary storage memory to be read by the memory control means to the beginning (refer to JP-A-2000-35938 (Patent Document 2), for example).

SUMMARY OF THE INVENTION

In a receiver that supplies selected transport streams serially to a decoder by controlling the reading of data from a buffer so as to keep the remaining amount of the buffer can be kept substantially constant, the remaining amount of the buffer may change largely when the selected transport stream is changed in accordance with the change of the selection of a program by a user. When the remaining amount of the buffer changes largely, the overflow or underflow of the buffer may occur if the capacity of the buffer is not enough. As a result, the selected transport streams to be supplied to the decoder may be lost, which causes temporary interruption of images and/or voice.

Accordingly, in order to keep the remaining amount of a buffer substantially constant, the proposition of a method that keeps the PCR jitter low is demanded excluding the method for controlling the reading of data from the buffer.

Accordingly, it is desirable to keep the PCR jitter low easily in a receiver for digital broadcasting, for example.

According to an embodiment of the present invention, there is provided an information processing apparatus that processes a multiplexed stream including a frame having multiple slots, which is obtained by multiplexing multiple streams containing time information describing times, the apparatus including extracting means for extracting predetermined one or more slots from the frame of the multiplexed stream, storage means for storing data of the slot or slots extracted from the frame, and frequency dividing means for generating a second clock signal by frequency-dividing a first clock signal by a frequency division ratio N:M based on, of the first clock signal, the number of clocks N corresponding to the time for one frame in the multiplexed stream and the number of clocks M for reading the data of the slot or slots extracted from the one frame from the storage means in the time for the one frame, wherein the data of the slot or slots stored in the storage means is read in synchronization with the second clock signal.

According to another embodiment of the invention, the information processing apparatus may further include decoding means for decoding data of a transport stream, which is data of the slot read from the storage means.

According to another embodiment of the invention, there is provided an information processing method that processes a multiplexed stream including a frame having multiple slots, which is obtained by multiplexing multiple streams containing time information describing times, the method including the steps of extracting predetermined one or more slots from the frame of the multiplexed stream, storing data of the slot or slots extracted from the frame, and generating a second clock signal by frequency-dividing a first clock signal by a frequency division ratio N:M based on, of the first clock signal, the number of clocks N corresponding to the time for one frame in the multiplexed stream and the number of clocks M for reading the data of the slot or slots extracted from the one frame from the storage means in the time for the one frame, wherein the data of the slot or slots stored in the storage means is read in synchronization with the second clock signal.

According to another embodiment of the invention, one or more slots is or are extracted from a frame of a multiplexed stream, and data of the slot or slots extracted from the frame is stored in storage means. Then, a second clock signal is generated by frequency-dividing a first clock signal by a frequency division ratio N:M based on, of the first clock signal, the number of clocks N corresponding to the time for one frame in the multiplexed stream and the number of clocks M for reading the data of the slot or slots extracted from the one frame from the storage means in the time for the one frame. The data of the slot or slots stored in the storage means is read in synchronization with the second clock signal.

According to the embodiments of the invention, the PCR jitter, for example, can be kept low easily.

DESCRIPTION OF THE PREFERRED EMBODIMENTS

Figure 1:
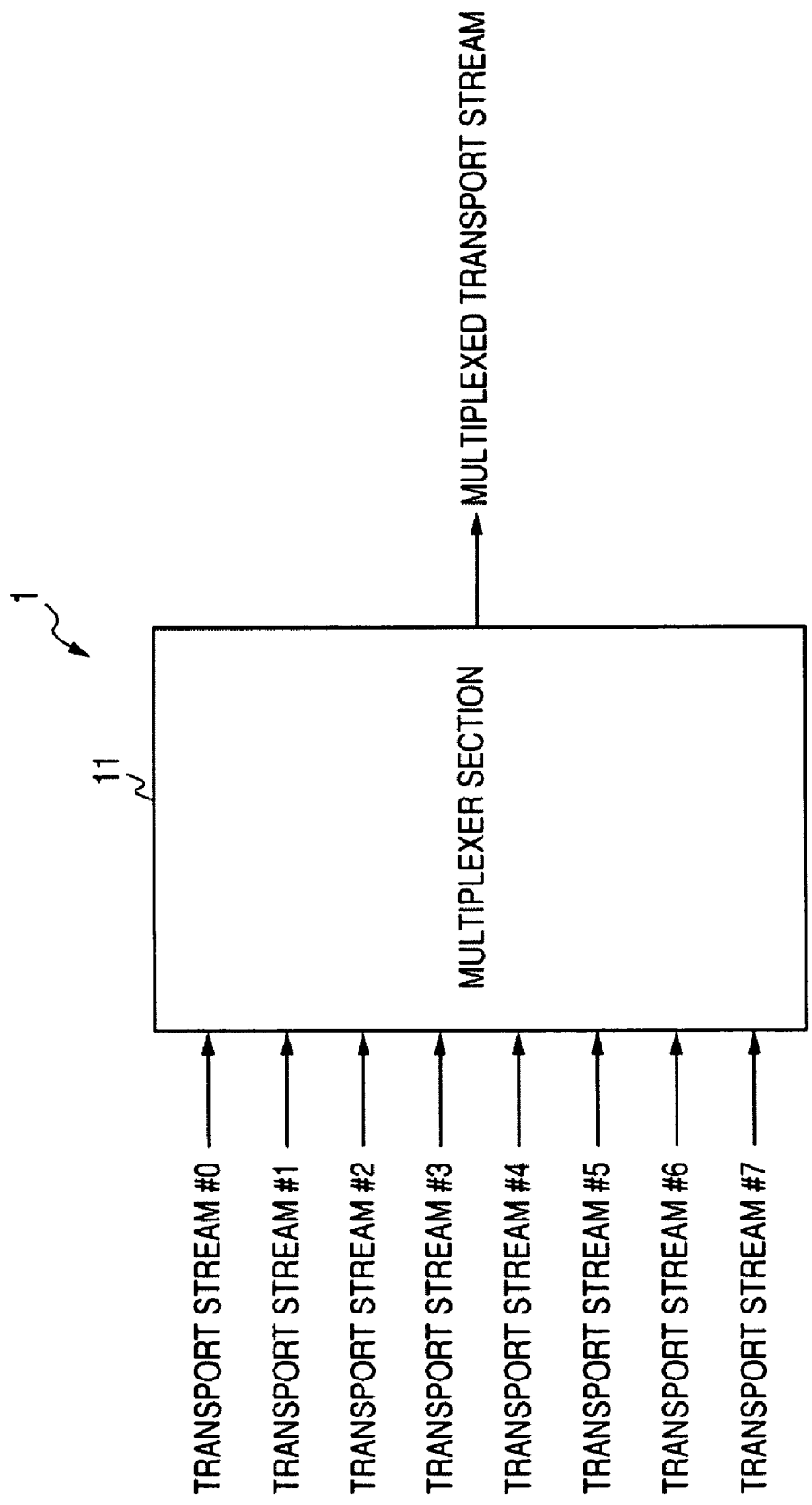
FIG. 1 is a diagram showing a configuration example of a part of a transmitter 1 for digital broadcasting.
Figure 2:
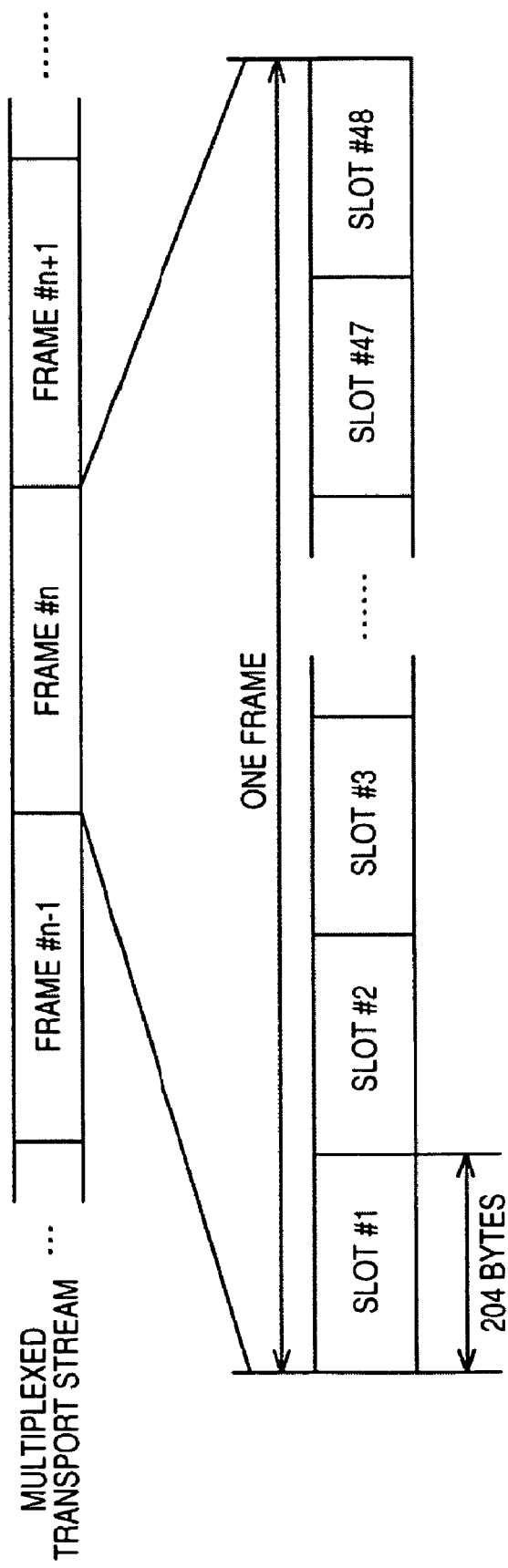
FIG. 2 is a diagram showing a multiplexed transport stream.
Figure 3:
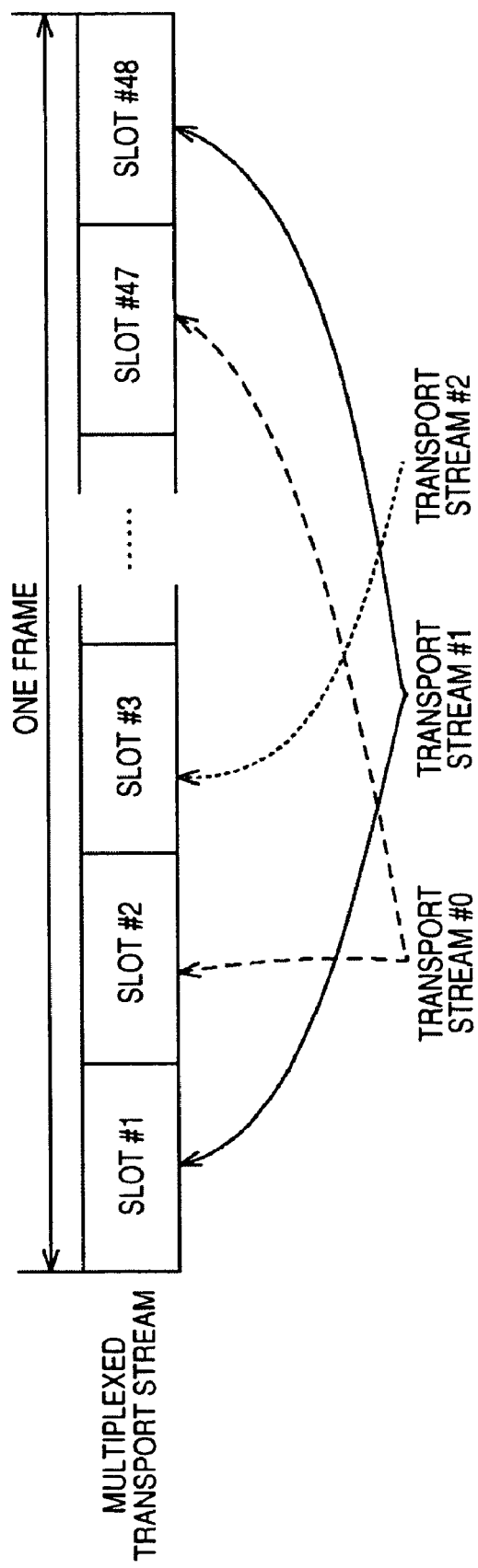
FIG. 3 is a diagram showing how transport streams #0 to #7 are assigned to slots #1 to #48.
Figure 4:
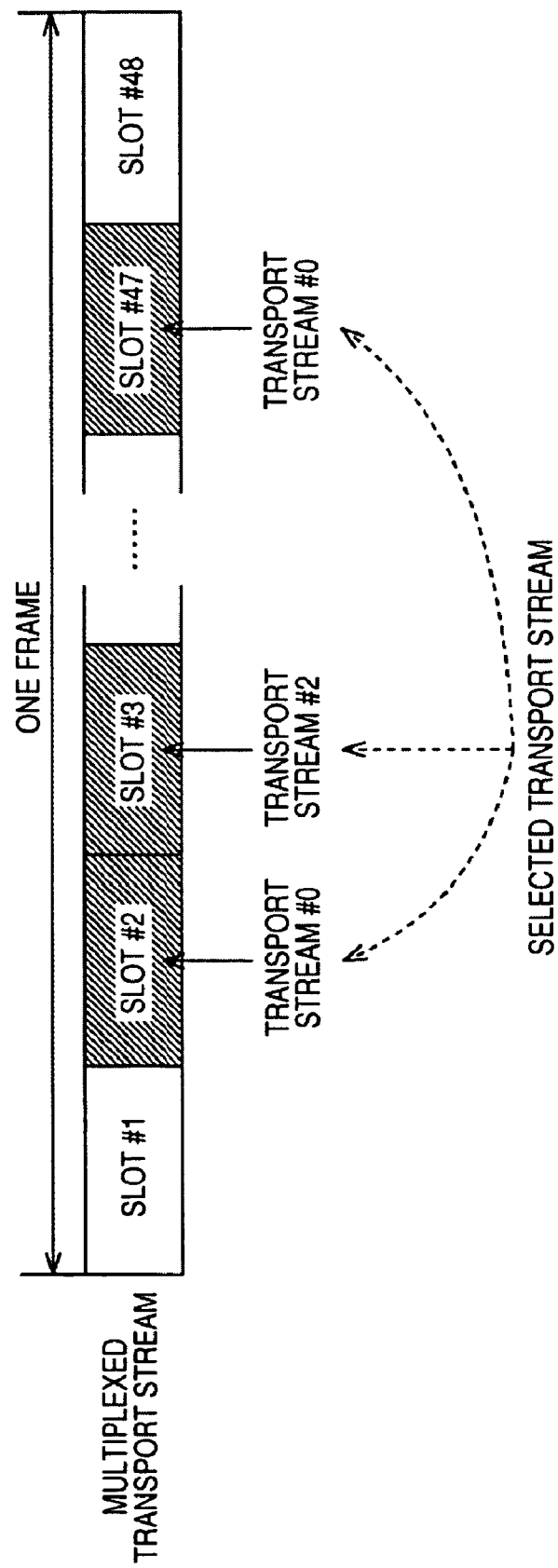
FIG. 4 is a diagram showing a multiplexed transport stream.

Embodiments of the invention will be described below where the correspondence between constituent features of the invention and embodiments described in the specification or drawings will be illustrated as follows. This description is for confirming that embodiments supporting the invention are described in the specification or drawings. Therefore, the existence of an embodiment described in the specification or drawings but not described herein as an embodiment corresponding to a constituent feature of the invention does not mean that the embodiment does not correspond to the constituent feature. Conversely, the existence of an embodiment described herein as one corresponding to a constituent feature does not means that the embodiment does not correspond to other constituent features excluding the constituent feature.

According to an embodiment of the invention, there is provided an information processing apparatus (such as a receiver 31 in FIG. 5) that processes a multiplexed stream (such as FEC output data in FIG. 8) including a frame having multiple slots, which is obtained by multiplexing multiple streams containing time information describing times, the apparatus including:

extracting means (such as a demultiplexer 61 in FIG. 8) for extracting predetermined one or more slots from the frame of the multiplexed stream;

storage means (such as a buffer 63 in FIG. 8) for storing data of the slot or slots extracted from the frame; and frequency dividing means (such as an N:M frequency divider 62 in FIG. 8) for generating a second clock signal (such as a TS clock signal) by frequency-dividing a first clock signal (such as a system clock signal) by a frequency division ratio N:M based on, of the first clock signal, the number of clocks N corresponding to the time of one frame in the multiplexed stream and the number of clocks M for reading the data of the slot or slots extracted from the one frame from the storage means in the time for the one frame, wherein the data of the slot or slots stored in the storage means is read in synchronization with the second clock signal.

According to another embodiment of the invention, the information processing apparatus may further include decoding means (such as a decoder 45 in FIG. 5) for decoding data of a transport stream, which is data of the slot read from the storage means.

Figure 13:
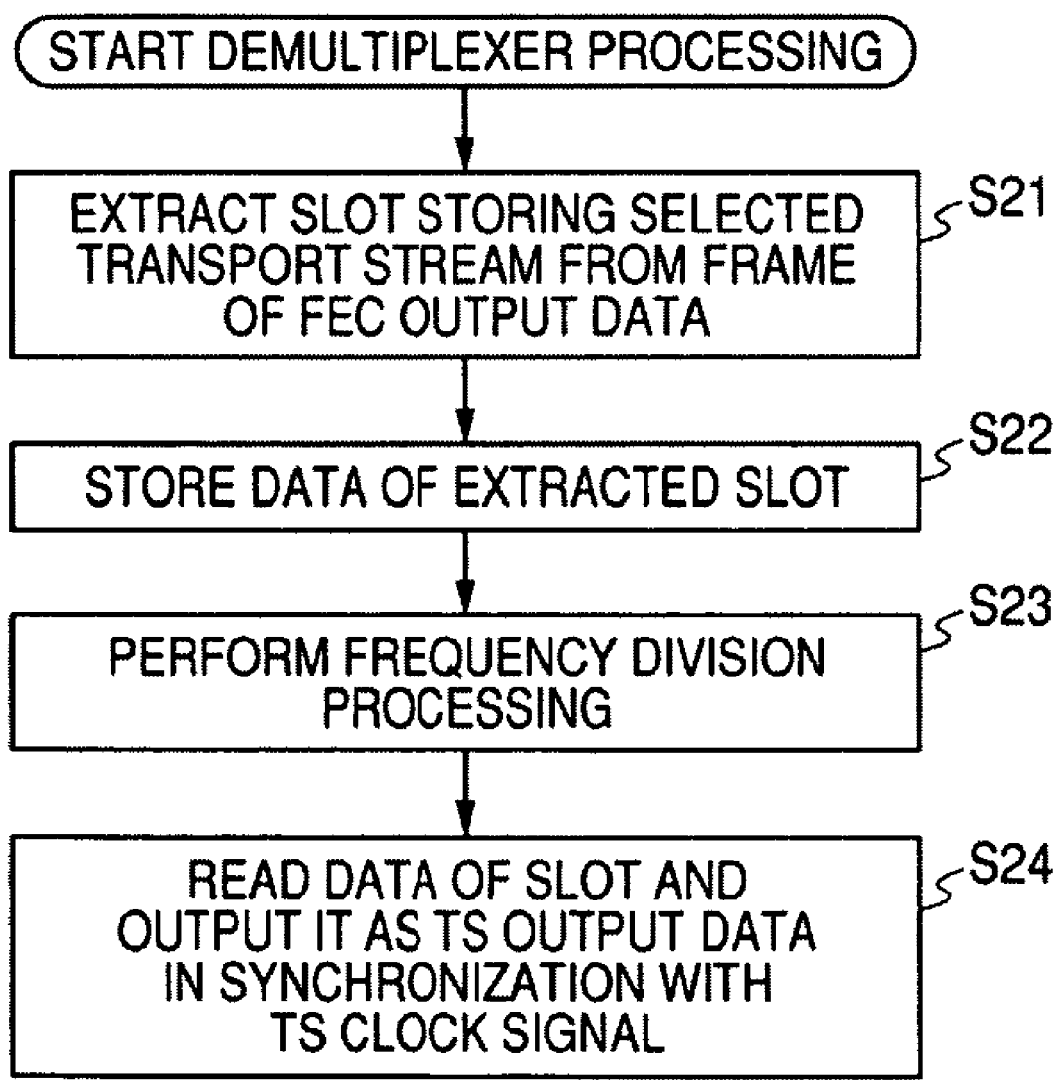
FIG. 13 is a flowchart illustrating demultiplexer processing to be performed by the demultiplexer section 44 in step S4 in FIG. 6.

According to another embodiment of the invention, there is provided an information processing method that processes a multiplexed stream (such as FEC output data in FIG. 8) including a frame having multiple slots, which is obtained by multiplexing multiple streams containing time information describing a time, the method including the steps of:

extracting predetermined one or more slots from the frame of the multiplexed stream (such as step S21 in FIG. 13);

storing data of the slot or slots extracted from the frame (such as step S22 in FIG. 13);

generating a second clock signal by frequency-dividing a first clock signal by a frequency division ratio N:M based on, of the first clock signal, the number of clocks N corresponding to the time of one frame in the multiplexed stream and the number of clocks M for reading the data of the slot or slots extracted from the one frame from the storage means in the time for the one frame (such as step S23 in FIG. 13); and reading the data of the slot or slots stored in the storage means in synchronization with the second clock signal (such as step S24 in FIG. 13).

With reference to drawings, embodiments applying the invention will be described below.

Figure 5:
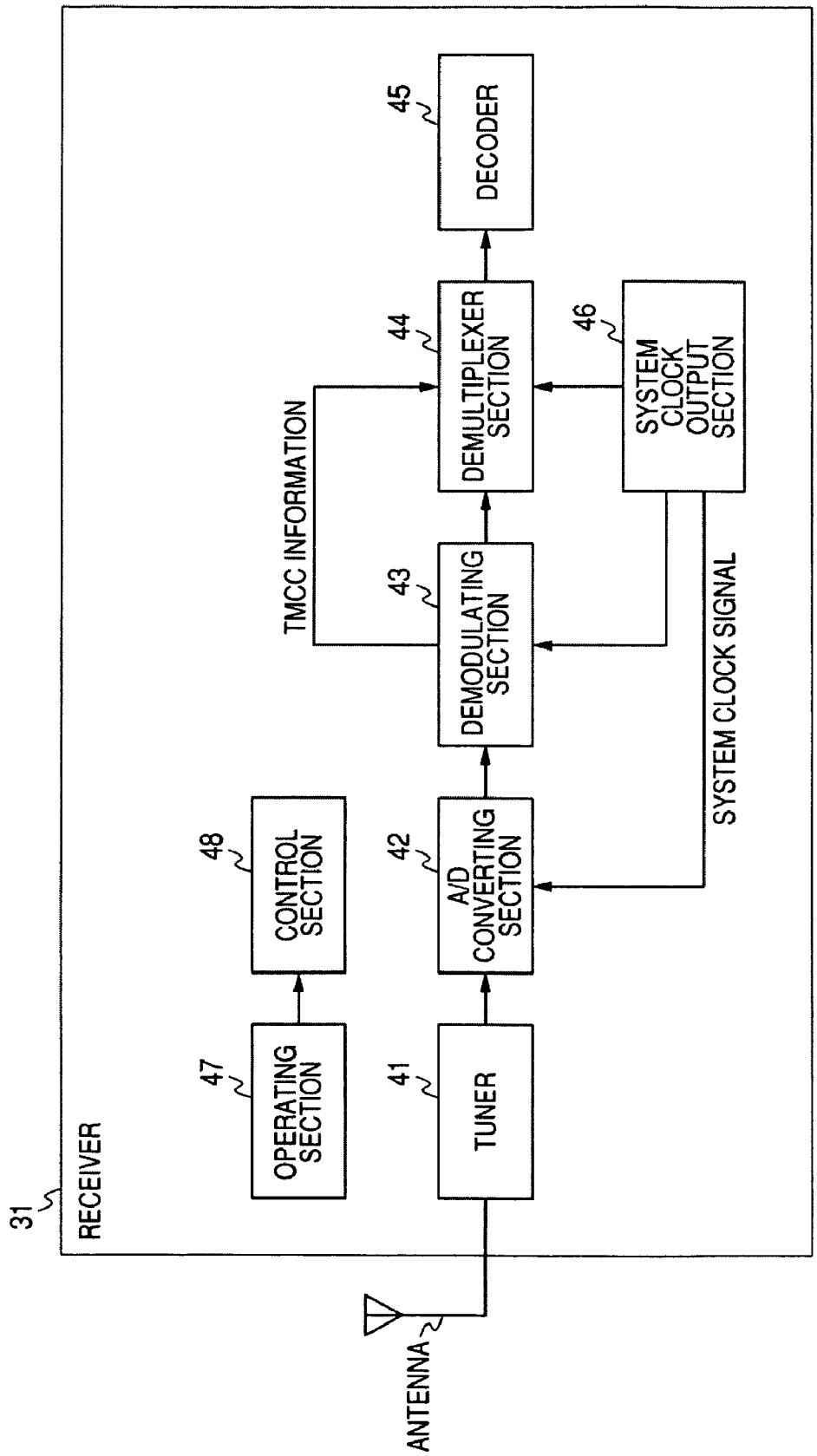
FIG. 5 is a block diagram showing a configuration example of a receiver according to an embodiment of the invention.

FIG. 5 is a block diagram illustrating a configuration example of a receiver according to an embodiment of the invention.

In FIG. 5, a receiver 31 includes a tuner 41, an A/D (analog/digital) converting section 42, a demodulating section 43, a demultiplexer section 44, a decoder 45, a system clock output section 46, an operating section 47 and a control section 48.

The tuner 41 of the receiver 31 receives broadcasting signals of digital broadcasting, which are supplied from an antenna, that is, broadcasting signals transmitted from a transmitter 1 and extracts and supplies broadcasting signals in a predetermined band corresponding to a predetermined program from the broadcasting signals to the A/D converting section 42.

The A/D converting section 42 A/D converts the broadcasting signals supplied from the tuner 41 and supplies the digitalized broadcasting signals resulting from the A/D conversion to the demodulating section 43.

The demodulating section 43 demodulates the broadcasting signals supplied from the A/D converting section 42, performs error correction processing on the demodulated broadcasting signals and supplies the resulting multiplexed transport stream to the demultiplexer section 44 as FEC (Forward Error Correction) output data. The demodulating section 43 further extracts and supplies TMCC information from the demodulated broadcasting signals to the demultiplexer section 44.

The demultiplexer section 44 performs demultiplexer processing, which will be described later, on the FEC output data supplied from the demodulating section 43 and supplies the resulting transport streams to the decoder 45 as TS output data.

The decoder 45 may include an MPEG decoder, for example, and decodes the TS output data supplied from the demultiplexer section 44 and outputs the resulting image data and voice data of the predetermined program.

The system clock output section 46 may internally contain an oscillator, not shown, for example, and generates system clock signals based on the outputs of the oscillator and supplies the signals to the A/D converting section 42, demodulating section 43, demultiplexer section 44 and other necessary blocks as operation clock signals for synchronization in an operation.

The operating section 47 may include a button and/or keys, for example, and generates an operation signal corresponding to an operation by a user and supplies the signal to the control section 48.

The control section 48 controls components of the receiver 31. The control section 48 performs processing based on the operation signal supplied from the operating section 47.

Figure 6:
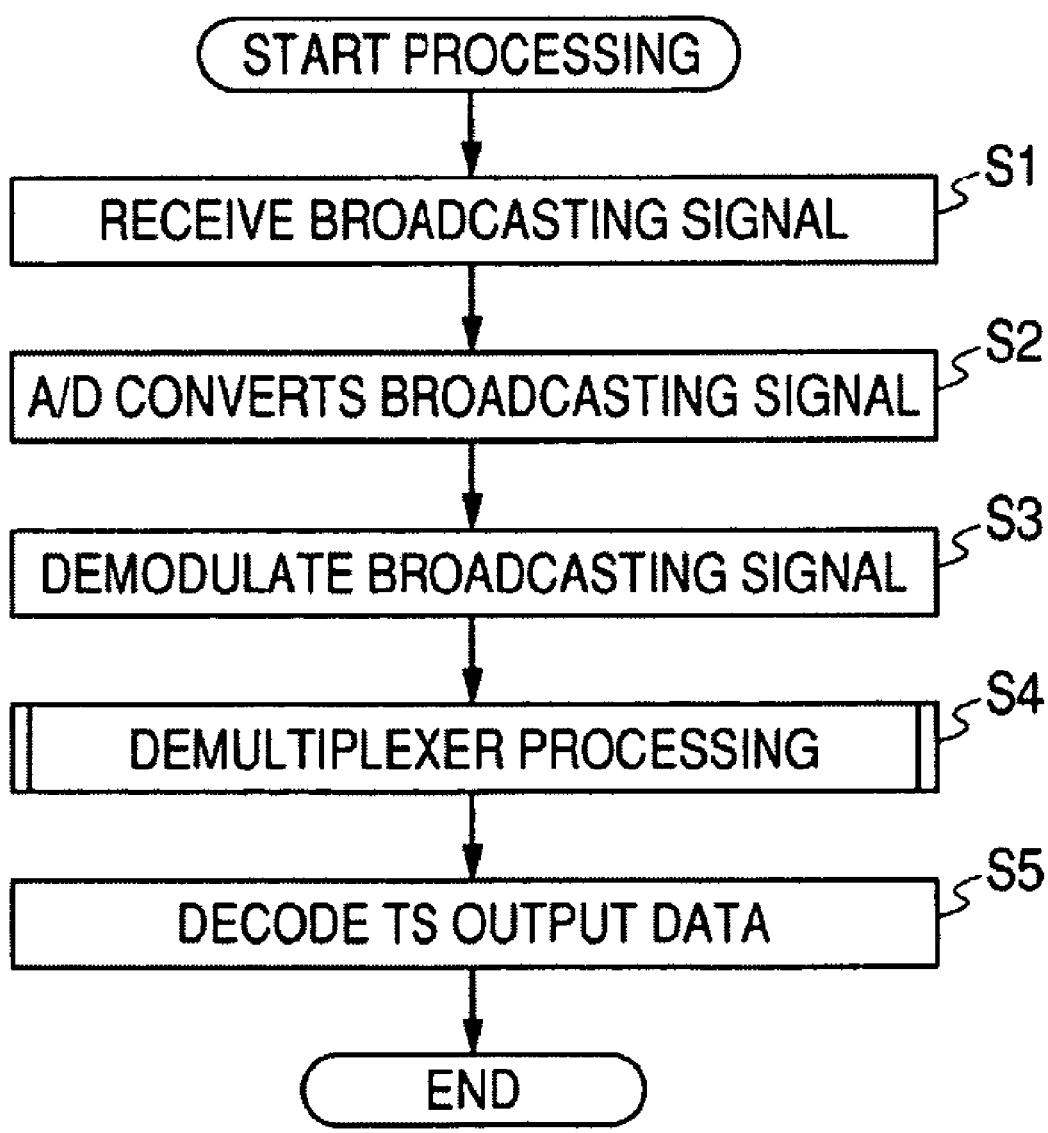
FIG. 6 is a flowchart describing processing by a receiver 31.

Next, with reference to the flowchart in FIG. 6, processing by the receiver 31 will be described.

In step S1, the tuner 41 receives broadcasting signals of digital broadcasting supplied from an antenna and extracts and supplies broadcasting signals in a predetermined band corresponding to a predetermined program from the broadcasting signals to the A/D converting section 42. Then, the processing moves from step S1 to step S2.

In step S2, the A/D converting section 42 A/D converts the broadcasting signals supplied from the tuner 41 in synchronization with the system clock signal supplied from the system clock output section 46 and supplies the digitized broadcasting signals resulting from the A/D conversion to the demodulating section 43. Then, the processing moves from step S2 to step S3.

In step S3, the demodulating section 43 demodulates the broadcasting signals supplied from the A/D converting section 42 in synchronization with the system clock signal supplied from the system clock output section 46, performs error correction processing on the demodulated broadcasting signals and supplies the resulting multiplexed transport stream to the demultiplexer section 44 as FEC output data. The demodulating section 43 further extracts and supplies TMCC information from the demodulated broadcasting signals to the demultiplexer section 44. Then, the processing moves from step S3 to step S4.

In step S4, the demultiplexer section 44 performs demultiplexer processing on the FEC output data supplied from the demodulating section 43 in synchronization with the system clock signal supplied from the system clock output section 46 and supplies the resulting transport streams to the decoder 45 as TS output data. Then, the processing moves from step S4 to step S5.

In step S5, the decoder 45 decodes the TS output data output from the demultiplexer section 44 and outputs the resulting image data and voice data of the predetermined program.

Figure 7:
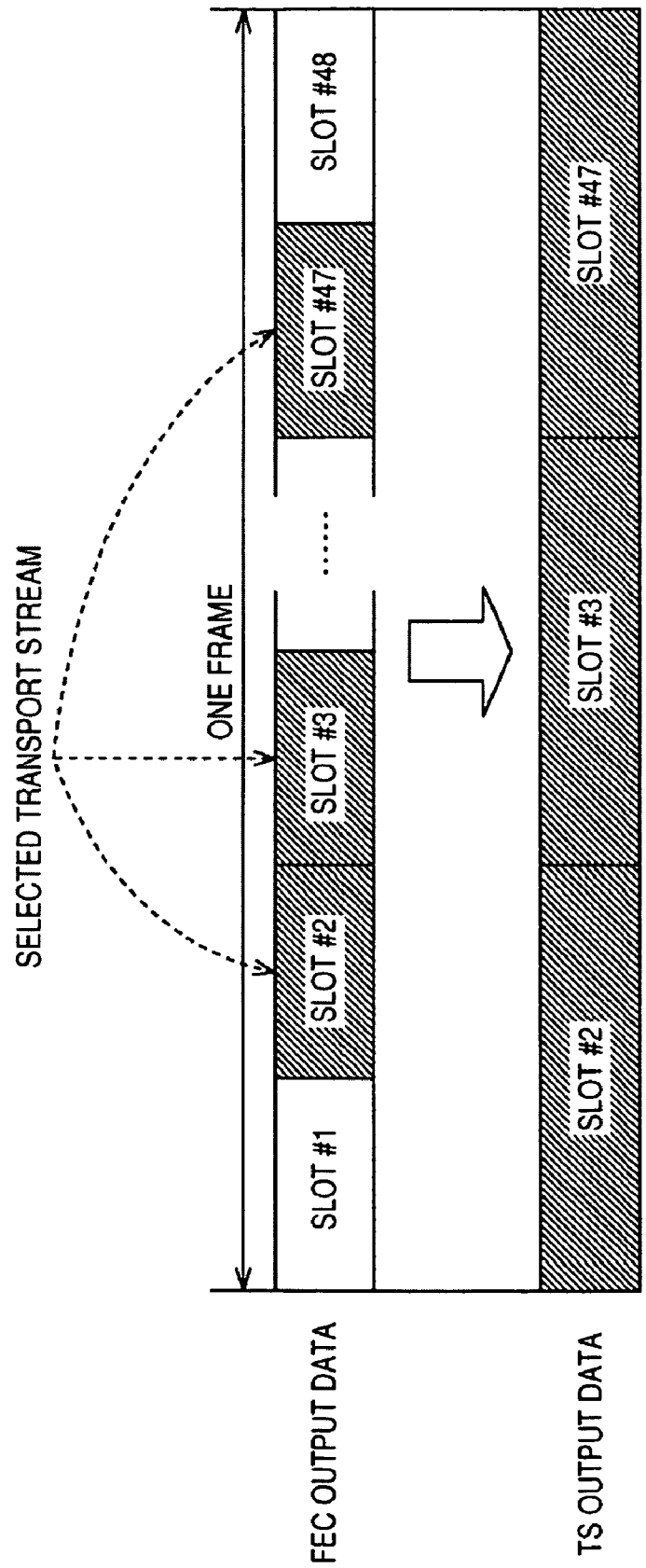
FIG. 7 is a diagram showing FEC output data and TS output data.

FIG. 7 shows the FEC output data supplied from the demodulating section 43 to the demultiplexer section 44 and the TS output data supplied from the demultiplexer section 44 to the decoder 45.

FIG. 7 shows the FEC output data above and the TS output data below.

In FIG. 7, slots #2, #3 and #47 (shaded) of the FEC output data stores selected transport streams, which are transport streams of a program preselected by a user for viewing, for example.

The demultiplexer section 44 extracts the slots #2, #3 and #47 storing the selected transport streams from one frame of the FEC output data above of FIG. 7 and supplies the data of the slots #2, #3 and #47 extracted from one frame to the decoder 45 at a constant rate in a time for one frame of the FEC output data, as shown at the bottom of the FIG. 7.

Here, TS output data is the data of the slots supplied at a constant rate from the demultiplexer section 44 to the decoder 45.

Figure 8:
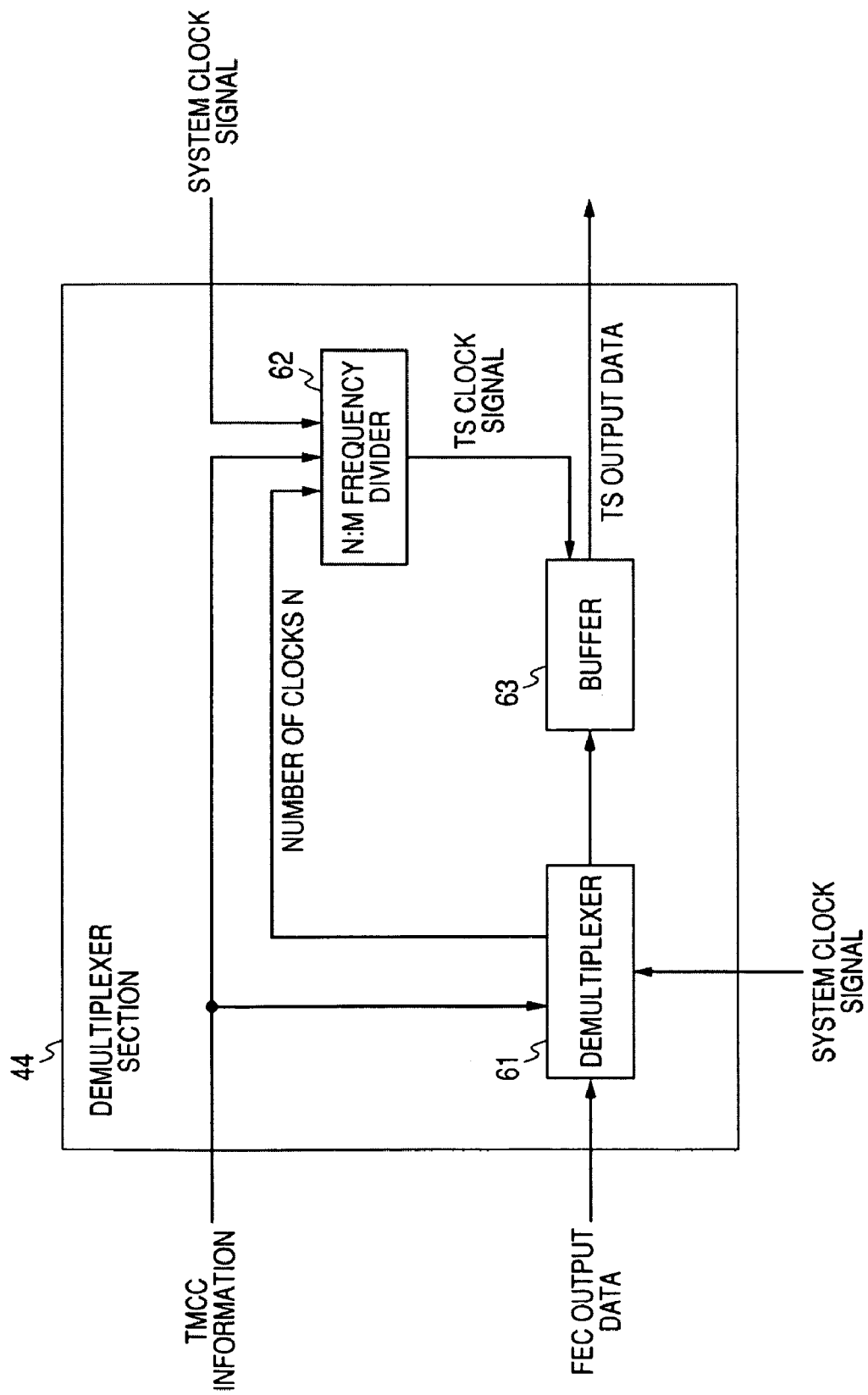
FIG. 8 is a block diagram showing a configuration example of a demultiplexer section 44.

FIG. 8 is a block diagram showing a configuration example of the demultiplexer section 44 in FIG. 5.

In FIG. 8, the demultiplexer section 44 includes a demultiplexer 61, an N:M frequency divider 62 and a buffer 63.

To the demultiplexer 61 of the demultiplexer section 44, the TMCC information and FEC output data are supplied from the demodulating section 43 in FIG. 5, and system clock signals are supplied from the system clock output section 46 in FIG. 5.

The demultiplexer 61 extracts a predetermined one or more slots from a frame of the FEC output data supplied from the demodulating section 43. In other words, the demultiplexer 61 identifies the slots storing the selected transport streams based on information describing the assignment of the transport streams to the slots, which is included in the TMCC information supplied from the demodulating section 43, and extracts and supplies the data of the slots from the FEC output data from the demodulating section 43 to the buffer 63.

The demultiplexer 61 further counts the number of clocks of the system clock signals supplied from the system clock output section 46 within the time for one frame of the FEC output data supplied from the demodulating section 43 and supplies the result of the count, that is, the number of clocks N of the system clock signals for the time for one frame to the N:M frequency divider 62.

Here, the number of clocks N for a time of 1.38 ms for one frame of system clock signals is about 85100 where the system clock frequency is 61.5 MHz and the time for each one clock is therefore about 16.2 ns.

The N:M frequency divider 62 may include a fractional frequency divider, for example.

To the N:M frequency divider 62, TMCC information is supplied from the demodulating section 43 in FIG. 5, and system clock signals are supplied from the system clock output section 46 in FIG. 5.

The N:M frequency divider 62 obtains the number of clocks M for reading data of a slot extracted from one frame from the buffer 63 at a constant rate in the time for one frame based on the TMCC information supplied from the demodulating section 43 and generates and supplies TS clock signals, which are clock signals to be used for reading data from the buffer 63, to the buffer 63 by frequency-dividing the system clock signals by a frequency division ratio of N:M.

The buffer 63 stores the data of the slot, which is supplied from the demultiplexer 61. The buffer 63 reads stored data of a slot on a byte-by-byte basis and supplies the data as TS output data to the decoder 45 in synchronization with the TS clock signals supplied from the N:M frequency divider 62.

Figure 9:
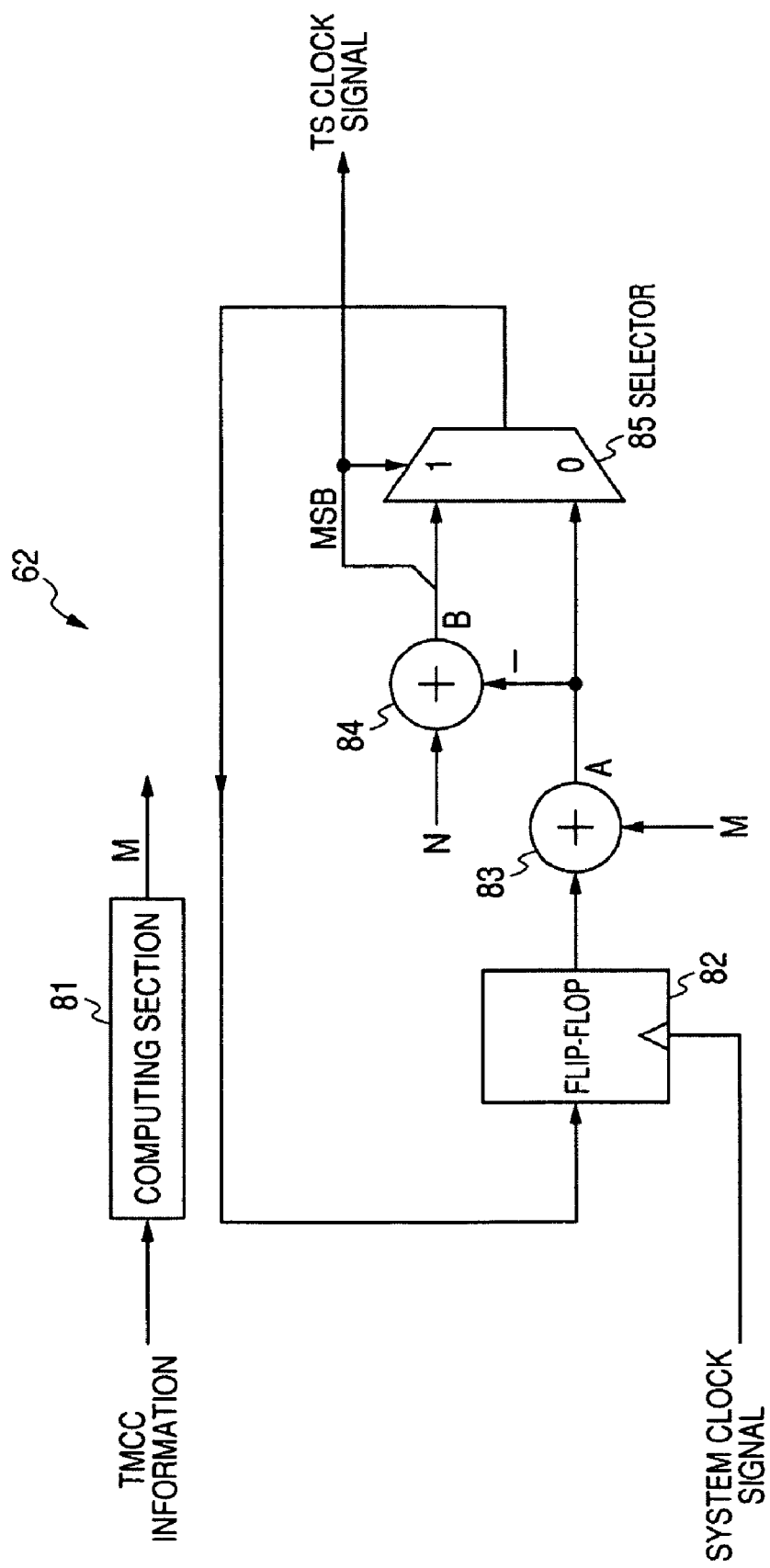
FIG. 9 is a block diagram showing a configuration example of an N:M frequency divider 62.

FIG. 9 is a block diagram showing a configuration example of the N:M frequency divider 62 in FIG. 8.

In FIG. 9, the N:M frequency divider 62 includes a computing section 81, a flip-flop 82, an adder 83, an adder 84 and a selector 85.

TMCC information is supplied from the demodulating section 43 in FIG. 5 to the computing section 81 of the NM frequency divider 62.

The computing section 81 obtains the number of slots storing selected transport streams for each frame based on the TMCC information supplied from the demodulating section 43, calculates the product between the number of slots and a data length 204 (bytes) of one slot, and supplies the product as the number of clocks M to the adder 83.

Here, the number of clocks M is the number of clocks for reading data of slots, which are extracted from one frame, from the buffer 63 at a constant rate in a time for the one frame.

Notably, the data of the number of clocks M calculated by the computing section 81, the data of the number of clocks N supplied from the demultiplexer 61, and the data handled by the flip-flap 82, adder 83, adder 84 and selector 85 are expressed by complement numbers of 2.

System clock signals are supplied from the system clock output section 46 in FIG. 5 to the flip-flop 82.

The flip-flop 82 latches the data supplied from the selector 85 and supplies the result to the adder 83 in synchronization with the system clock signals supplied from the system clock output section 46.

The adder 83 adds the data supplied from the flip-flop 82 and the number of clocks M supplied from the computing section 81 and supplies the data A resulting from the addition to the adder 84 and the selector 85.

The number of clocks N is supplied from the demultiplexer 61 in FIG. 8 to the adder 84.

The adder 84 subtracts the data A from the number of clocks N by adding the number of clocks N supplied from the demultiplexer 61 and the value of data A with the opposite sign, which is supplied from the adder 83, and supplies data B resulting from the subtraction to the selector 85. The adder 84 supplies the most significant BIT (MSB) of the data B to the selector 85 as a select control signal and to the buffer 63 in FIG. 7 as a TS clock signal.

In other words, the adder 84 supplies the most significant bit "0" of the data B to the selector 85 as a select control signal and to the buffer 63 in FIG. 8 as a TS clock signal if the data B is equal to or higher than 0. The adder 84 supplies the most significant bit "1" of the data B to the selector 85 as a select control signal and to the buffer 63 in FIG. 7 as a TS clock signal if the data B is negative.

The selector 85 selects and supplies one of the data A supplied from the adder 83 and the data B supplied from the adder 84 to the flip-flop 82 based on a select control signal supplied from the adder 84.

In other words, the selector 85 selects and supplies a select control signal supplied from the adder 84, that is, the data A supplied from the adder 83 to the flip-flop 82 if the most significant bit of the data B is "0". The selector 85 selects and supplies a select control signal supplied from the adder 84, that is, the data B supplied from the adder 84 to the flip flop 82 if the most significant bit of the data B is "1".

Figure 10:
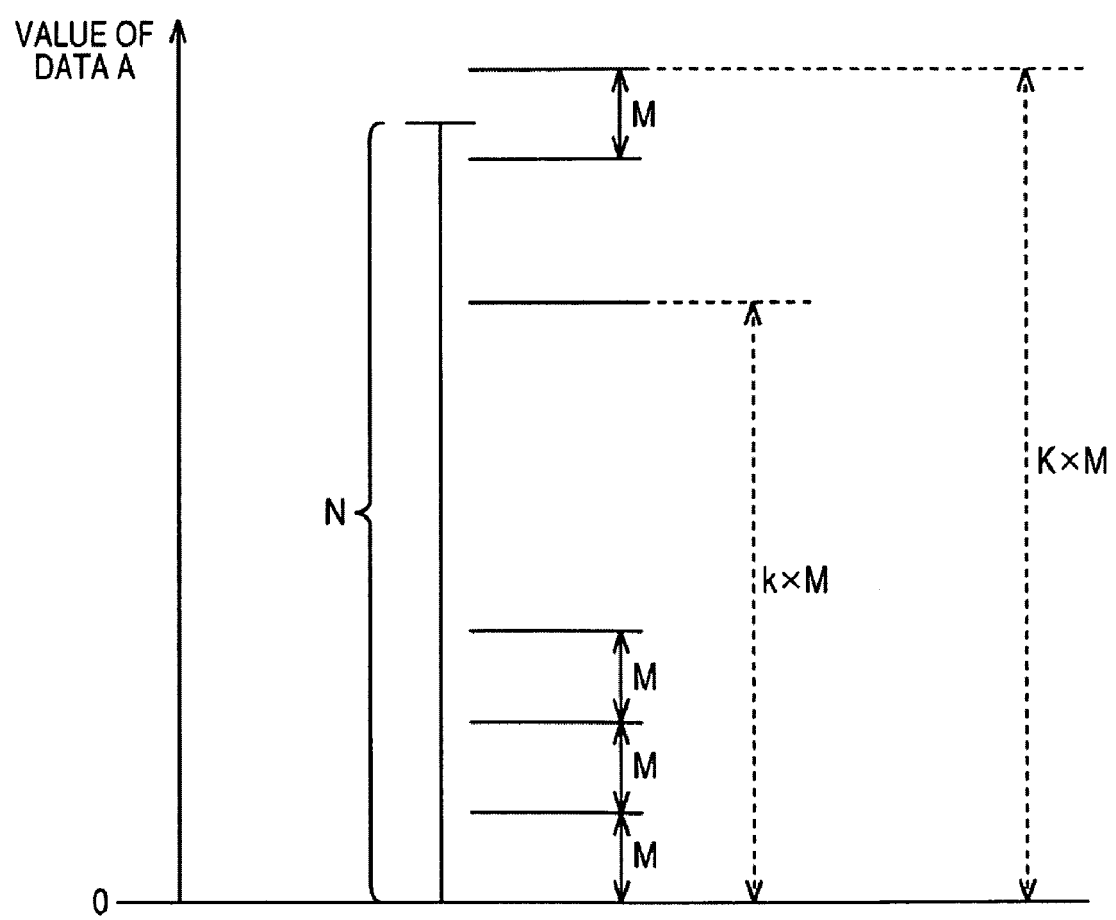
FIG. 10 is a diagram illustrating an operation by the N:M frequency divider 62.

FIG. 10 is a diagram illustrating an operation by the N:M frequency divider 62.

In FIG. 10, the vertical axis indicates the value of the data A output by the adder 83 of the N:M frequency divider 62.

If the value of the data supplied from the flip flop 82 to the adder 83 is "0" at the first clock of the system clock signals, the adder 83 adds the value "0" and the number of clocks M, and the value "M" resulting from the addition is supplied as the data A to the adder 84 and selector 85.

The adder 84 subtracts the value M of the data A from the number of clocks N by adding the number of clocks N from the demultiplexer 61 in FIG. 8 and the value −M of the data A with the opposite sign from the adder 83 and supplies the value N−M resulting from the subtraction as the data B to the selector 85. Since M is not larger than N, the value N−M of the data B is equal to or higher than "0". Therefore, the adder 84 supplies the most significant bit "0" of the data B to the selector 85 as a select control signal and to the decoder 45 in FIG. 5 as a TS clock signal.

The selector 85 after receiving the select control signal in which the value from the adder 84 is "0" selects and supplies the value M as the data A from the adder 83 to the flip-flop 82.

The flip-flop 82 latches and supplies the value M as the data A from the selector 85 at the second clock of the system clock signals to the adder 83.

The adder 83 adds the value M of the data from the flip-flop 82 and the number of clocks M and supplies the value 2×M resulting from the addition to the adder 84 and selector 85 as the data A.

The adder 84 subtracts the value 2×M of the data A from the number of clocks N by adding the number of clocks N from the demultiplexer 61 in FIG. 8 and a value −2×M of the data A with the opposite sign from the adder 83 and supplies the value N−2×M resulting from the subtraction to the selector 85 as the data B. Then, if the value N−2×M of the data B is equal to or higher than "0", the adder 84 supplies the most significant bit "0" of the data B as a select control signal to the selector 85 and as a TS clock signal to the decoder 45 in FIG. 5.

In the same manner, if the data B is equal to or higher than "0", that is, if the most significant bit of the data B is "0", the data A is selected by the selector 85 and is supplied to the flip-flop 82.

Here, at the k(k×M≦N)th clock of the system clock signals, the value of the data supplied from the flip-flop 82 to the adder 83 is (k−1)×M, and the value of the data A output from the adder 83 is therefore k×M.

After that, if the number of clocks of the system clock signals reaches the Kth clock that satisfies the expression (K−1)×M≦N<k×M, the value of the data A output from the adder 83 is k×M, which is larger than N.

In this case, the value N−K×M resulting from the subtraction of the value K×M of the data A from the number of clocks N, which is obtained by the adder 84, is negative, and the negative value N−K×M is supplied to the selector 85 as the data B. Then, since the value N−K×M of the data B is negative, the adder 84 supplies the most significant bit "1" of the data B as a select control signal to the selector 85 and as a TS clock signal to the decoder 45 in FIG. 5.

In this case, the selector 85 selects and supplies the data B from the adder 83 to the flip-flop 82.

The flip-flop 82 latches and supplies the value N−K×M as the data B from the selector 85 to the adder 83 at the K+1th clock of the system clock signals.

The adder 83 adds the value N−K×M from the flip-flop 82 and the number of clocks M and supplies the value N−(K−1)×M, which is equal to or higher than "0" to the adder 84 and selector 85 as the data A. Then, the same processing is performed subsequently.

In this way, the N:M frequency divider 62 outputs the TS clock signal, which is turned to H-level (or has the value "1") once every K clocks or K+1 clocks of the system clock signals.

Now, for simple description, if there is a relationship expressed by an expression K×M=N, the TS clock signals can be turned to H level once every K clocks of the system clock signals and can therefore be H-level N/K times, that is, K×M/K=M times for N clocks of the system clock signals.

Figure 11:
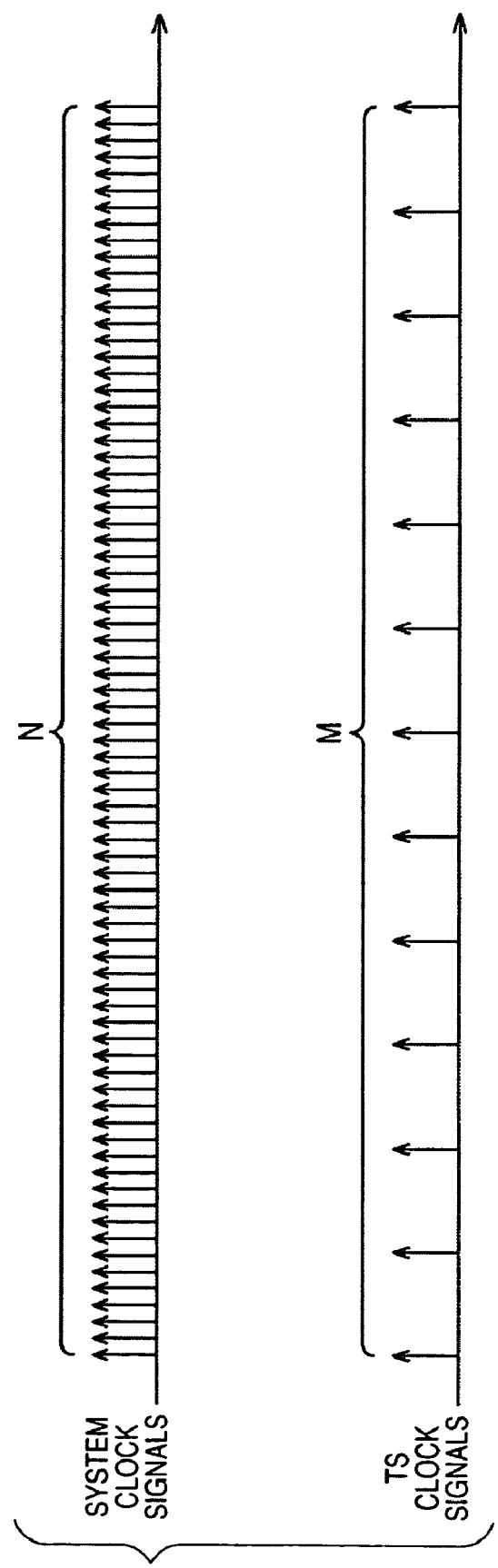
FIG. 11 is a diagram showing system clock signals and TS clock signals.

FIG. 11 shows the system clock signals supplied from the system clock output section 46 to the N:M frequency divider 62 in FIG. 5 and the TS clock signals supplied from the N:M frequency divider 62 to the buffer 63.

FIG. 11 shows the system clock signals above and the TS clock signals below.

The N:M frequency divider 62 generates TS clock signals of M clocks for the time for one frame by frequency-dividing the system clock signals of N clocks for the time for one frame by the frequency division ratio N:M based on the number of clocks N supplied from the demultiplexer 61 and the number of clocks M supplied from the computing section 81.

Figure 12:
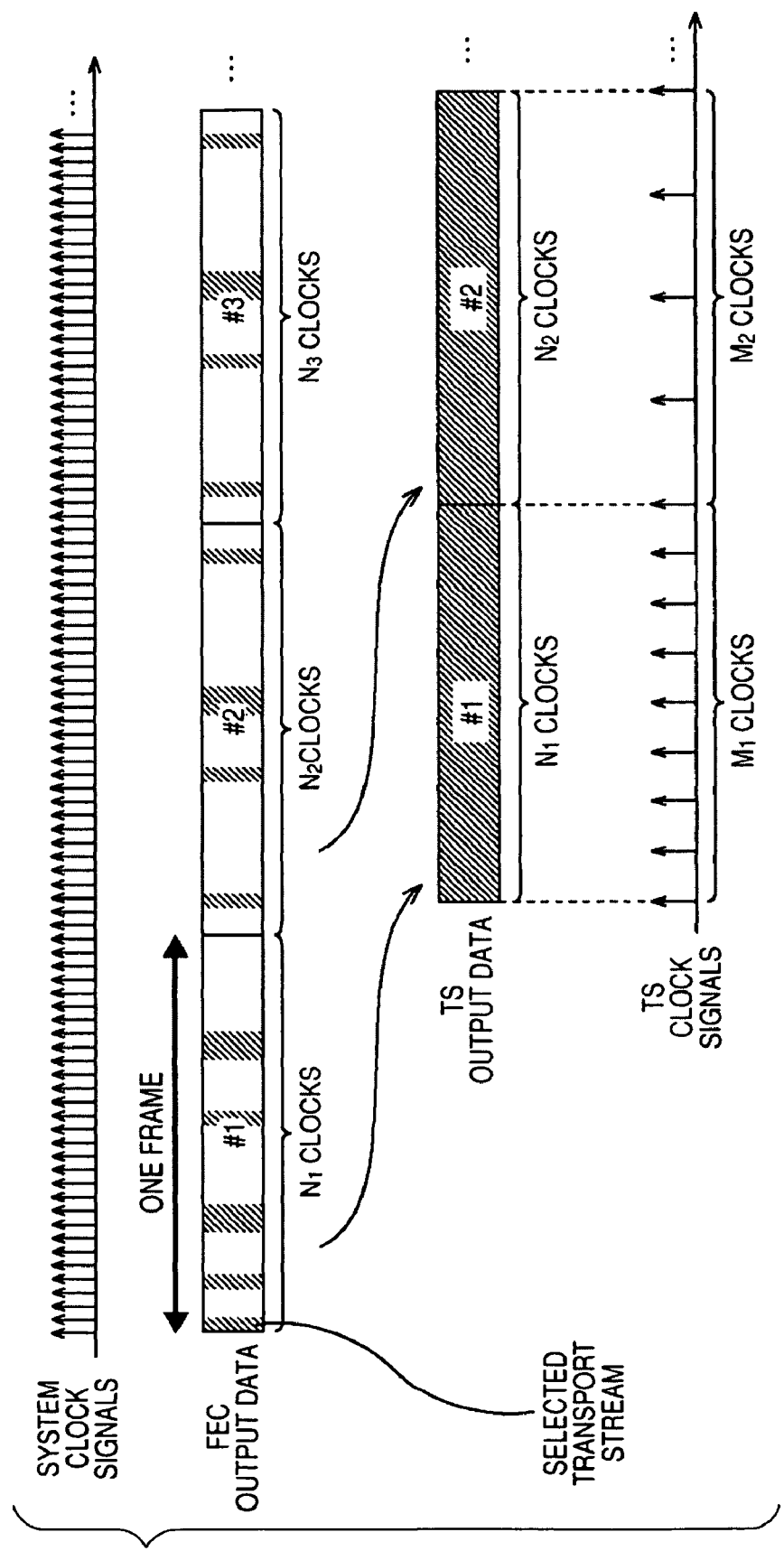
FIG. 12 is a diagram illustrating demultiplexer processing by the demultiplexer section 44.

FIG. 12 is a diagram illustrating the demultiplexer processing by the demultiplexer section 44 in FIG. 8.

The first part above of FIG. 12 shows system clock signals supplied from the system clock output section 46 in FIG. 5 to the demultiplexer 61. The second part from above of the FIG. 12 shows frames #1 to #3 of the FEC output data supplied from the demodulating section 43 in FIG. 5 to the demultiplexer 61. The third part from the above of the FIG. 12 shows frames #1 and #2 of the TS output data supplied from the buffer 63 to the decoder 45 in FIG. 5. The fourth part from the above of FIG. 12 shows the TS clock signals supplied from the N:M frequency divider 62 to the buffer 63.

The demultiplexer 61 extracts slots storing data of selected transport streams, shaded in FIG. 12, from the frame #1 of the FEC output data from the demodulating section 43 and supplies the data of the slots to the buffer 63. Then, the buffer 63 stores the data of the slots supplied from the demultiplexer 61.

The demultiplexer 61 further supplies the number of clocks $N_1$ to the N:M frequency divider 62 if the number of clocks $N_1$ of the system clock signals from the system clock output section 46 is counted in the time for the frame #1.

In the N:M frequency divider 62, the number of bytes of the data of the slots extracted from the frame #1 is obtained as a number of clocks $M_1$ for reading the data of the slots extracted from the frame #1 from the buffer 63 in the time for the frame #1. The N:M frequency divider 62 generates the TS clock signals of the number of clocks $M_1$ in the time for the frame #1 by frequency-dividing the system clock signals by a frequency division ratio $N_1:M_1$ based on the number of clocks $N_1$ from the demultiplexer 61 and the number of clocks $M_1$ and supplies the TS clock signals to the buffer 63.

The buffer 63 reads $M_1$ bytes of the data of the slots extracted from the frame #1 in the stored data at a constant rate in the time for the frame #1, that is, the time for the number of clocks $N_1$ of the system clock signals and outputs them to the decoder 45 in synchronization with the TS clock signals from the N:M frequency divider 62.

The demultiplexer 61 further extracts slots storing the data of the shaded selected transport streams from the frame #2 of the FEC output data form the demodulating section 43 and supplies the data of the slots to the buffer 63. Then, the buffer 63 stores the data of the slots supplied from the demultiplexer 61.

The demultiplexer 61 further supplies the number of clocks $N_2$ to the N:M frequency divider 62 if the number of clocks $N_2$ of the system clock signals from the system clock output section 46 is counted in the time for the frame #2.

In the N:M frequency divider 62, the number of bytes of the data of the slots extracted from the frame #2 is obtained as the number of clocks $M_2$ for reading the data of the slots extracted from the frame #2 from the buffer 63 in the time for the frame #2. The N:M frequency divider 62 generates the TS clock signals of the number of clocks $M_2$ in the time for the frame #2 by frequency-dividing the system clock signals by a frequency division ratio $N_2:M_2$ based on the number of clocks $N_2$ from the demultiplexer 61 and the number of clocks $M_2$ and supplies the TS clock signals to the buffer 63.

The buffer 63 reads $M_2$ bytes of the data of the slots extracted from the frame #2 in the stored data at a constant rate in the time for the frame #2, that is, the time for the number of clocks $N_2$ of the system clock signals and outputs them to the decoder 45 in synchronization with the TS clock signals from the N:M frequency divider 62.

The same processing is performed on the frame #3 and subsequent frames of the FEC output data.

With reference to the flowchart in FIG. 13, details of the demultiplexer processing to be performed by the demultiplexer section 44 in FIG. 8 in step S4 in FIG. 6 will be described.

To the demultiplexer 61 in the demultiplexer section 44, TMCC information and FEC output data are supplied from the demodulating section 43 in FIG. 5, and system clock signals are supplied from the system clock output section 46 in FIG. 5. To the N:M frequency divider 62, TMCC information is supplied from the demodulating section 43 in FIG. 5, and system clock signals are supplied from the system clock output section 46 in FIG. 5.

In step S21, the demultiplexer 61 extracts a predetermined one or more slots from a frame of the FEC output data supplied from the demodulating section 43. In other words, the demultiplexer 61 identifies a slot storing a selected transport stream based on information describing the assignment of transport streams to slots, which is included in the TMCC information supplied from the demodulating section 43, and extracts and supplies data of the slot from the FEC output data from the demodulating section 43 to the buffer 63.

The demultiplexer 61 counts the number of clocks of the system clock signals supplied from the demodulating section 43 within the time for one frame of the FEC output data supplied from the demodulating section 43 and supplies the result of the counting, that is, the number of clocks N for the time for one frame of the system clock signals to the N:M frequency divider 62. Then, the processing moves from step S21 to step S22.

In step S22, the buffer 63 stores the data of the slot supplied from the demultiplexer 61, and the processing moves to step S23.

In step S23, the N:M frequency divider 62 performs frequency division processing. That is, the N:M frequency divider 62 obtains the number of bytes of the data of the slot, which is extracted from one frame, as the number of clocks M for reading the data from the buffer 63 at a constant rate in the time for one frame based on the TMCC information supplied from the demodulating section 43 and generates TS clock signals, which are clock signals used for reading data from the buffer 63 by frequency-dividing the system clock signals by the frequency division ratio N:M based on the number of clocks N supplied from the demultiplexer 61 and the number of clocks M, and supplies the TS clock signals. Then, the processing moves from step S23 to S24.

In step S24, the buffer 63 reads the stored data of the slots on a byte-by-byte basis and supplies the data as the TS output data to the decoder 45 in synchronization with the TS clock signals supplied from the N:M frequency divider 62.

In this way, the receiver 31 performs the demultiplexer processing, which is processing of generating TS clock signals by frequency-dividing the system clock signals by the frequency division ratio N:M based on the number of clocks N of the system clock signals corresponding to the time for one frame of FEC output data and the number of clocks M for reading the data of the slots extracted from the one frame in the time for one frame and reading the data of the slots stored in the buffer 63 in synchronization with the TS clock signals. Thus, the data of the slots extracted from one frame of FEC output data can be read from a buffer at a constant rate in the time for one frame. Therefore, the data of the slot read from the buffer 63, that is, the selected transport streams can be serially supplied to the decoder 45. As a result, the PCR jitter can be kept low.

The PCR jitter can be easily kept low in the receiver 1 without performing complicated processing such as detection of the remaining amount of a buffer and/or control over reading from the buffer so as to keep the remaining amount constant while, like in the receiver in the past, the remaining amount of a buffer is detected and the data reading from the buffer is controlled so as to keep the remaining amount constant in order to serially supply selected transport streams to a decoder by controlling the data reading from the buffer to keep the remaining amount of the buffer substantially constant.

Since, in the receiver 1, the data of slots extracted from one frame is read from the buffer 63 at a constant rate in the time for one frame, the overflow or underflow of the buffer 63 can be prevented. Furthermore, the selected transport streams supplied to the decoder 45 are not easily lost, which can prevent the interruption of images and/or voice.

Having described the case where the invention is applied to a receiver that receives digital broadcasting, the invention is applicable to any equipment that processes a multiplexed stream including a frame having multiple slots, which can be obtained by multiplexing multiple streams containing time information describing the time to be used in a decoder on the receiver side, in addition to the receiver for digital broadcasting.

Notably, having described that the N:M frequency divider 62 in FIG. 9, which is a fractional frequency divider, is adopted as the frequency dividing means for frequency-dividing system clock signals by a frequency division ratio N:M according to the embodiments of the invention, the frequency dividing means may be any arbitrary frequency divider that can allow frequency division by N:M.

Embodiments of the invention are not limited to the embodiments above, and various changes can be made thereto without departing from the scope and spirit of the invention.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus that processes a multiplexed stream including a frame having multiple slots, which is obtained by multiplexing multiple streams containing time information describing times, the apparatus comprising:

extracting means for extracting predetermined one or more slots from the frame of the multiplexed stream;

storage means for storing data of the slot or slots extracted from the frame; and frequency dividing means for generating a second clock signal by frequency-dividing a first clock signal by a frequency division ratio N:M based on, of the first clock signal, the number of clocks N corresponding to the time for one frame in the multiplexed stream and the number of clocks M for reading the data of the slot or slots extracted from the one frame from the storage means in the time for the one frame, wherein the data of the slot or slots stored in the storage means is read in synchronization with the second clock signal, the stream is a transport stream, and the extracting means extracts a slot storing a predetermined transport stream from the frame and identifies and extracts the slot storing the predetermined transport stream from the frame based on control information including information describing the assignment of transport streams to the slots.

2. The information processing apparatus according to claim 1, wherein the control information is TMCC (Transmission and Multiplexing Configuration Control) information of ISDB (Integrated Services Digital Broadcasting).

3. The information processing apparatus according to claim 1, further comprising:

decoding means for decoding data of a transport stream, which is data of the slot read from the storage means.

4. An information processing method that processes a multiplexed stream including a frame having multiple slots, which is obtained by multiplexing multiple streams containing time information describing times, the method comprising the steps of:

extracting predetermined one or more slots from the frame of the multiplexed stream;

storing data of the slot or slots extracted from the frame in a storage unit;

generating a second clock signal by frequency-dividing a first clock signal by a frequency division ratio N:M based on, of the first clock signal, the number of clocks N corresponding to the time for one frame in the multiplexed stream and the number of clocks M for reading the data of the slot or slots extracted from the one frame from the storage unit in the time for the one frame; and reading the data of the slot or slots stored in the storage unit in synchronization with the second clock signal, wherein the stream is a transport stream and a slot storing a predetermined transport stream from the frame is extracted and the slot storing the predetermined transport stream is identified and extracted based on control information including information describing the assignment of the transport stream to the slots.

5. An information processing apparatus that processes a multiplexed stream including a frame having multiple slots, which is obtained by multiplexing multiple streams containing time information describing times, the apparatus comprising:

an extracting unit configured to extract predetermined one or more slots from the frame of the multiplexed stream;

a storage unit configured to store data of the slot or slots extracted from the frame; and a frequency divider configured to generate a second clock signal by frequency-dividing a first clock signal by a frequency division ratio N:M based on, of the first clock signal, the number of clocks N corresponding to the time for one frame in the multiplexed stream and the number of clocks M for reading the data of the slot or slots extracted from the one frame from the storage in the time for the one frame, wherein the data of the slot or slots stored in the storage unit is read in synchronization with the second clock signal, the stream is a transport stream, and the extracting unit extracts a slot storing a predetermined transport stream from the frame and identifies and extracts the slot storing the predetermined transport stream from the frame based on control information including information describing the assignment of transport streams to the slots.

* * * * *